United States Patent
Bagger et al.

[11] Patent Number: 5,591,537
[45] Date of Patent: Jan. 7, 1997

[54] SOLID OXIDE FUEL CELL

[75] Inventors: Carsten Bagger; Bruno Kindl, both of Roskilde; Mogens Mogensen, Lynge, all of Denmark

[73] Assignee: Forskningscenter RISØ, Roskilde, Denmark

[21] Appl. No.: 513,823

[22] PCT Filed: Mar. 1, 1994

[86] PCT No.: PCT/DK94/00084

§ 371 Date: Oct. 26, 1995

§ 102(e) Date: Oct. 26, 1995

[87] PCT Pub. No.: WO94/20998

PCT Pub. Date: Sep. 15, 1994

[30] Foreign Application Priority Data

Mar. 1, 1993 [DK] Denmark .................. 0225/93

[51] Int. Cl.[6] .................................................. H01M 8/12
[52] U.S. Cl. ..................... 429/33; 429/40; 429/45; 429/46; 429/30
[58] Field of Search ............... 429/33, 40, 30, 429/45, 46

[56] References Cited

U.S. PATENT DOCUMENTS

| | | | |
|---|---|---|---|
| 5,057,362 | 10/1991 | Schroder et al. | 428/312.2 |
| 5,306,411 | 4/1994 | Mozanec et al. | 204/265 |
| 5,453,330 | 9/1995 | Kawasaki et al. | 429/30 |
| 5,500,307 | 3/1996 | Anzai et al. | 429/30 |

FOREIGN PATENT DOCUMENTS

| | | |
|---|---|---|
| 0424814 | 5/1991 | European Pat. Off. . |
| 0481332 | 4/1992 | European Pat. Off. . |
| 92/07393 | 4/1992 | WIPO . |

OTHER PUBLICATIONS

Kenjo et al, "LaMnO$_3$ air cathodes containing ZrO$_2$ electrolyte for high temperature solid oxide fuel cells", Solid State Ionics 57 (1992), North–Holland, pp. 295–302 (month N/A).

Primary Examiner—M. Nuzzolillo
Attorney, Agent, or Firm—Hill, Steadman & Simpson

[57] ABSTRACT

A solid oxide fuel cell includes a cathode, a YSZ-electrolyte, and an anode, where the cathode is formed by a mixture of LSM and YSZ. According to the invention the content in the cathode of YSZ amounts to 20 to 75% by weight, whereby it is possible to reduce the polarisation resistance to 0,08Ωcm$^2$ at 40 mV. Furthermore, a mechanically stable structure is obtained.

5 Claims, 6 Drawing Sheets

ı

SOLID OXIDE FUEL CELL

TECHNICAL FIELD

The invention relates to a solid oxide fuel cell comprising a cathode, a YSZ electrolyte and an anode, where the cathode is composed of a mixture of LMS and YSZ.

BACKGROUND ART

It is known from Solid State Ionics 57 (1992) 295–307 North-Holland to produce $LaMnO_3$ electrodes containing YSZ electrolyte. $LaMnO_3$ powder is mixed with YSZ in the ratio 1:1. The addition of YSZ reduces the polarisation resistance and improves the efficiency. The polarisation resistance was reduced to $0,18\Omega\cdot cm^2$ at 64 mV and approximately 900° C.

Furthermore European Patent Document; and EP 424,814 discloses a solid oxide fuel cell where the cathode is composed of a mixture of LSM and YSZ, the YSZ being stabilized by means of 8 to 10 mol % of $Y_2O_3$. As a result the polarisation resistance is slightly reduced.

DESCRIPTION OF THE INVENTION

The object of the invention is to provide a solid oxide fuel cell with a lower polarisation resistance than previously known. The solid oxide fuel cell must furthermore be easy to produce.

A solid oxide fuel cell of the above type is according to the invention characterised by the content in the cathode of YSZ amounting to 20–75% by weight, and by the YSZ of the cathode containing less $Y_2O_3$ than the YSZ of the electrolyte, preferably less than 8 mol % of $Y_2O_3$, especially approximately 3 mol % of $Y_2O_3$. As a result the polarisation resistance can be reduced to $0,08\Omega\cdot cm^2$ or less at 40 mV at approximately 1000° C. Furthermore a mechanically stable structure is obtained.

Furthermore Mn may according to the invention be added to the cathode material in excess. In this manner a further reduction of the polarisation resistance is rendered possible under predetermined circumstances. Moreover a layer of LSM may according to the invention be sintered on the outside of the cathode.

BRIEF DESCRIPTION OF THE INVENTION

The invention is explained in greater detail below with reference to the accompanying drawings, in which FIG. 1 illustrates a solid oxide fuel cell according to the invention, FIG. 2 illustrates an equivalent circuit, FIG. 3 illustrates a dilatometric curve of a YSZ sheet, FIG. 4 shows a measurement of the electrode impedance illustrating that the polarisation resistance (i.e. the portion of the horizontal axis found below the curve) is $0.08\Omega\cdot cm^2$ at the illustrated conditions, FIG. 5 illustrates a set-up for testing a solid oxide fuel cell, FIG. 6 illustrates an electric circuit for testing the cell, FIG. 7 illustrates a conductor path pattern forming a current collection network on the electrode, FIG. 8 illustrates the voltage measured at the center of the cell and at the rim of the cell, respectively, versus the current intensity, FIG. 9 illustrates an electric equivalent circuit resulting from division of the cell into five concentric rings, FIG. 10 illustrates the distribution of current and voltage drop between five annular portions of the cell, and FIG. 11 illustrates current density functions from the center to the rim.

DESCRIPTION OF THE PREFERRED EMBODIMENTS OF THE INVENTION

Parameters, such as temperature, oxygen partial pressure, heat treatment, porosity, electrode thickness, composition and particle size of the cathode material are of vital importance for the efficiency of a fuel cell because the packing density of the cathode material depends on these parameters.

The reaction resistance during an oxygen-reducing process depends on the number of triple contact points, where gas, electrolyte, and electrode can be brought into contact with each other with the result that an electro-chemical reaction can take place. Thus, the reaction resistance depends on the packing density of the layer of cathode material being in direct contact with the electrolyte.

Electro-chemical impedance measurements have been used for studying the efficiency of $La_{1-x}Sr_xMnO_3$ (LSM)— based cathodes at 1000° C., $pO_2=0.21$ atm and a polarisation of $\eta=0$ mV. Three effects were studied. The mixture of fine and coarse grained LSM; the addition of different types of YSZ (TZ3Y & TZ8Y) in different amounts; and the addition to LSM samples with or without YSZ of Mn in form of $MnO_2$ powder or by LSM synthesis.

The results obtained show that the reaction resistance $R_p$ (also called the polarisation resistance) for the oxygen-reducing process decreases when fine and coarse grained LSM is admixed. The polarisation resistance $R_p$ decreases too at increasing amounts of YSZ, the effect being strongest with TZ3Y. The effect of adding Mn depends on the amount of YSZ in the LSM sample and on the production of the sample with additional Mn (addition of $MnO_2$ or synthesis of $LSM_{1,1}$).

Figure 1:
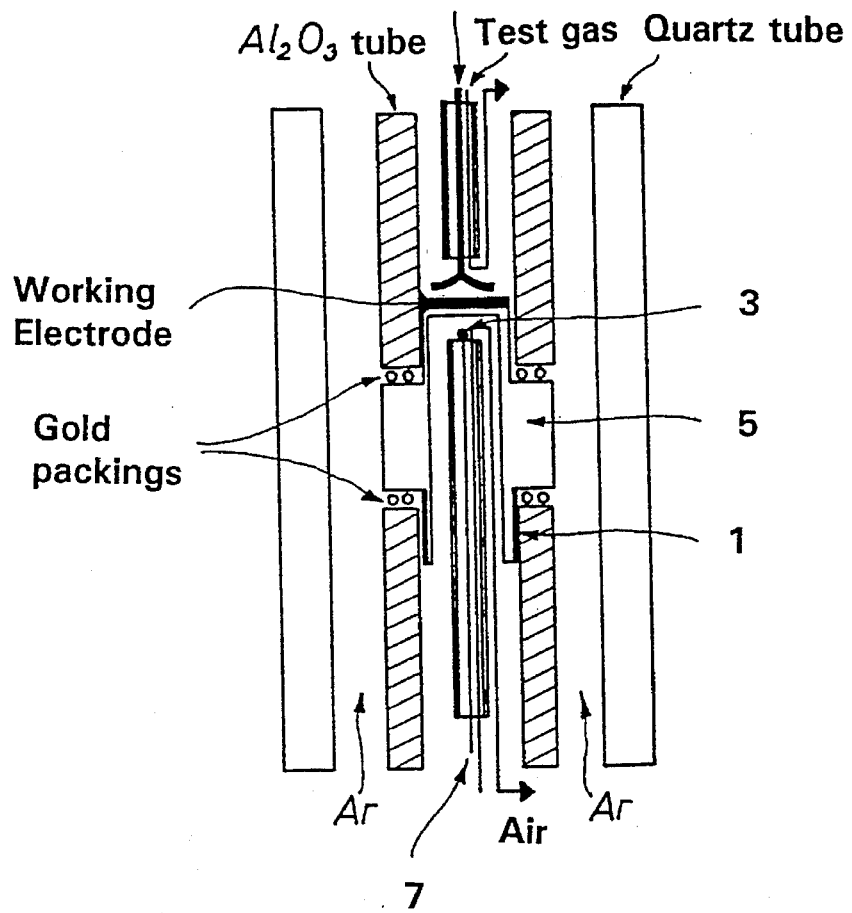

Electro-chemical measurements are performed on a three-electrode cell, cf. FIG. 1, where the sample was used as working electrode. Two platinum electrodes 1 and 3 were used as a backplate electrode and reference electrode, respectively. The electrolyte 5 was made of yttrium stabilized zirconium oxide (YSZ 8 mol %) TZ8Y. The samples are produced with two layers differing with respect to composition and thickness, cf. Table 1; viz. a thin C-layer being in direct contact with the electrolyte 5, and a porous layer thicker than the C-layer and called the CCC-layer. These two layers have different functions. The CCC-layer is porous in order to allow passage of oxygen molecules to the reaction zone and is used as current collector. The C-layer provides a) a good contact with the electrolyte 5, and b) triple contact zones, where gases, the electrode and the electrolyte are in mutual contact and where the electrochemical reaction takes place.

The samples are produced by injection of slurries of the various layers onto the electrolyte 5, a sintering usually being performed after each injection. The slurries are pretreated with the LSM—powder of different organic solvents and dispergents. Different amounts of organic solvents or dispergents are required in response to the particle size of the LSM—powder in order to provide a suitable slurry. The cell was placed in an oven, and air was blown over the manganite electrode. The temperature in the oven was kept constant by means of a temperature controller and measured by means of thermoelements 7 while employing a multiplexer (HP 3421 A). The gas flows were adjusted by means of a Brooks mass flow controller 5850TR and a Brooks controlling unit 5878.

An impedance measurement was performed by means of a Solartron 1250 frequency analyzer and an EG & G PAR potentiostate/galvanostate model 273. The same potentiostate was used for cyclic voltametric and chromatographic measurements. The measurements were performed at 1000° C., $PO_2$=0.21 atm and a polarisation of $\mu$=0 mV.

Figure 2:
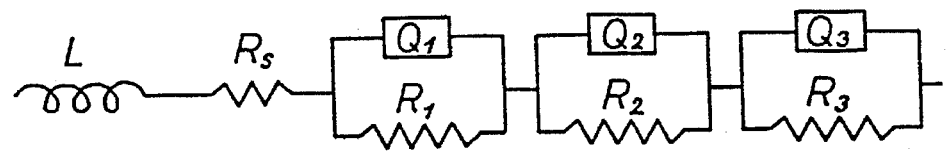
Figure 3:
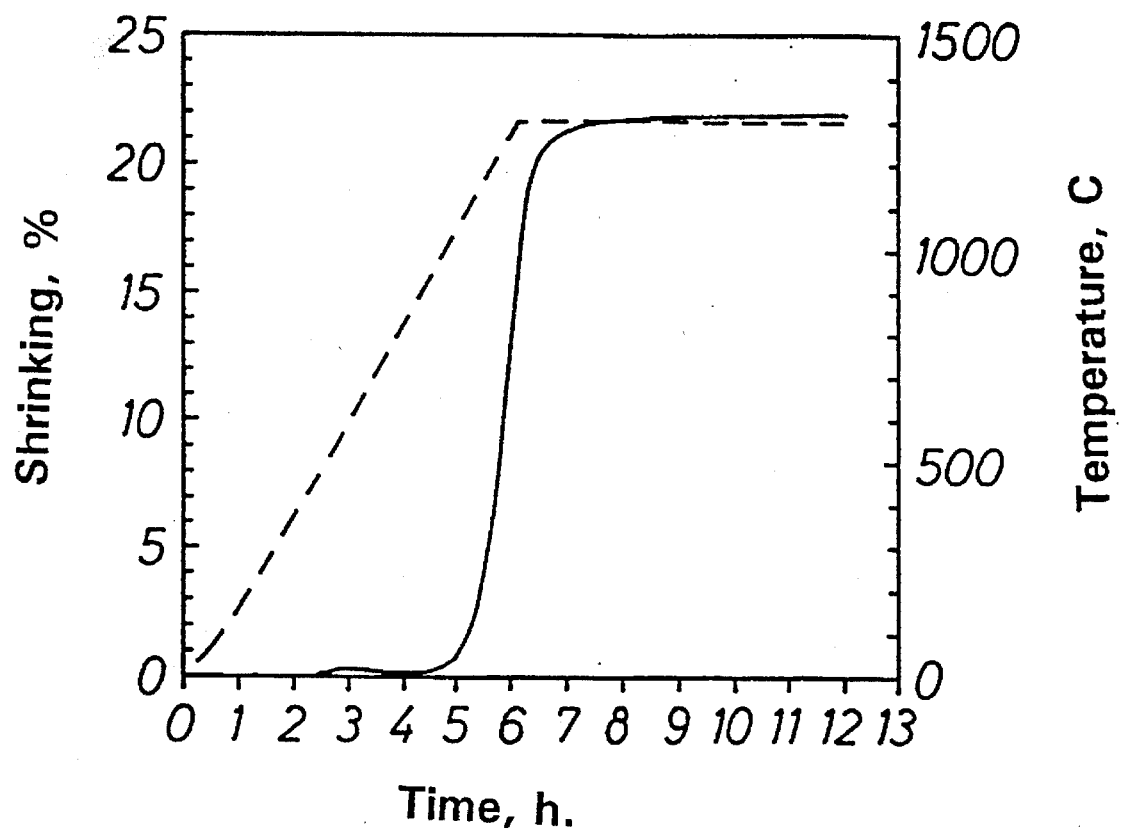

The series resistance $R_S$, cf. FIG. 2, is substantially due to the electrolyte 5, and it was measured together with the electro-chemical reaction resistance $R_p$ of the electrodes 1 and 3 by way of impedance measurements at the free potential $\mu$=0 mV.

A curve adjustment of the impedance measurements was performed by means of the program "Equivalent Circuit", test data in the admittance plane being adjusted to an equivalent circuit including resistances R, capacities C, inductances L, and elements with a constant phase (CPE), Q.

The admittance of the elements with a constant phase CPE is found by:

$$Q^*(\omega) = Q_0 \cdot (j\omega)^n = Q_0 \cdot \omega^n \cdot \left[ \cos\left(\frac{n\pi}{2}\right) + j \cdot \sin\left(\frac{n\pi}{2}\right) \right]$$

which is a general dispersion formula. When n=0 it represents a resistance R with $R=Q_0^{-1}$, when n=1 a capacitance with $C=Q_0$, when n=0.5 a Warburg, and when n=−1 an inductance with $L=Q_0^{-1}$.

The electric equivalent circuit resulting from the curve adjustment appears from FIG. 2, where L is the inductance caused by the electric connections between the cell and the measuring instruments. $R_S$ is the series resistance including the resistance of the electric connections, the electrolyte resistance, and the resistance of the CCC—layer of the electrode. $R_1$ & $Q_1$, $R_2$ & $Q_2$, $R_3$ & $Q_3$ represent different reaction steps in the oxygen-reducing process. The polarisation resistance $R_p$ is calculated as follows:

$$R_p = R_1 + R_2 + R_3$$

Table 1 shows the composition and the polarisation resistance of the studied samples. The results appear from the Table where the samples have been divided into three groups.

TABLE 1

Table 1: Composition and polarisation resistance of the samples. Measurements have been performed at 1000° C., $pO_2$ = 0.21 atm and 0 mV. All percentages in wt %.

| SAMPLE | C-LAYER | | CCC-LAYER | $R_P$ ($\Omega cm^2$) |
|---|---|---|---|---|
| 91-8, P2 | #35A | | #1009 | 19.8 |
| 91-7, P1 | 79% #35A + 21% TZ7Y | | #1009 | 4.4 |
| 91-19 | #1010A (ERL, screen printing) | | #1010A | 9.4 |
| CA-LSM-1 | 80% #1009 + 20% YSZ (ERL, screen printing) | | 50% #1010A + 50% #43A | 3.7 |
| 91-17 | 80% #1009 + 20% YSZ (ERL, screen printing) | | #1010A | 2.7 |
| CA-LSM-2 | 80% #1009 + 20% YSZ (ERL, screen printing) | | 50% #1010A + 50% #43A | 1.0 |
| HT1 | 90% Pecchini calc. 600° C. + 10% TZ3Y | | 90% Pecchini (1480° C.) + 10% TZ3Y | 1.1 |
| HT2 | 90% Pecchini calc. 600° C. + 10% TZ3Y | | 90% Pecchini (1480° C.) + 10% TZ3Y | 0.9 |
| HT3 | 90% Pecchini calc. 600° C. + 10% TZ3Y | | 90% Pecchini (1480° C.) + 10% TZ3Y | 0.8 |
| CA-LSM-4 | 40% #1010A + 40% #43A + 20% TZ8Y | (C0) | 50% #1010A + 50% #43A | 0.9 |
| CA-LSM-5 | 40% #1010A + 40% #43A + 20% TZ8Y | (C0) | 50% #1010A + 50% #43A | 1.1 |
| CA-LSM-16 | 40% #1010A + 40% #43A + 10% TZ8Y + 10% TZ8Y 1100° C. 2h | (C4) | 50% #1010A + 50% #43A | 1.4 |
| CA-LSM-17 | 30% #1010A + 30% #43A + 20% TZ8Y + 20% TZ8Y 1100° C. 2h | (C5) | 50% #1010A + 50% #43A | 0.5 |
| 91-13, P3 | 40% #1010A + 40% #43A + 20% TZ8Y | | 50% #1010A + 50% #43A | 0.7 |
| 91-14, P4 | 40% #1010A + 40% #43A + 20% TZ3Y | | 50% #1010A + 50% #43A | 0.5 |
| CA-LSM-22 | 40% #1010A + 40% #49A + 20% TZ3Y | (C10) | 50% #1010A + 50% #43A | 0.3 |
| CA-LSM-18 | 40% #1010A + 40% #43A** + 10% TZ8Y + 10% TZ8Y 1100° C. 2h | (C6) | 50% #1010A + 50% #43A | 1.0 |
| CA-LSM-19 | 30% #1010A + 30% #43A** + 20% TZ8Y + 20% TZ8Y 1100° C. 2h | (C7) | 50% #1010A + 50% #43A | 0.5 |
| CA-LSM-20 | 50% #46A* fine + 50% #46A* coarse | (C8) | 50% #1010A + 50% #43A | 2.7 |
| CA-LSM-21 | 40% #46A* fine + 40% #46A* coarse + 20% TZ8Y | (C9) | 50% #1010A + 50% #43A | 0.65 |
| CA-LSM-26 | 30% #51* fine + 30% #51* coarse + 40% TZ3Y | (C12) | 50% #1010A + 50% #43A | 0.25 |
| CA-LSM-27 | 30% #51* fine + 30% #51* coarse + 40% TZ3Y | (C12) | 50% #1010A + 50% #43A | 0.2 |
| CA-LSM-28 | 30% #51* fine + 30% #51* coarse + 40% TZ3Y | (C12) | 50% #1010A + 50% #43A | 0.3 |

*: $LSM_{1.1}$ from synthesis
**: 10 mol % Mn added as $MnO_2$

| | |
|---|---|
| FINE GRAINED LSM WITHOUT YSZ | 91-8 |
| + 21% FINE TZ7Y | 91-7 |
| COARSE GRAINED LSM WITHOUT YSZ | 91-19 |
| + 20% FINE YSZ | CA-LSM-1 |
| + 20% FINE YSZ | 91-17 |
| + 20% FINE YSZ | CA-LSM-2 |
| + 10% FINE YSZ | HT1 |
| + 10% FINE YSZ | HT2 |
| + 10% FINE YSZ | HT3 |
| FINE + COARSE GRAINED LSM | |
| + 20% FINE TZ8Y | CA-LSM-4 |

TABLE 1-continued

| | |
|---|---|
| + 20% FINE TZ8Y | CA-LSM-5 |
| + 10% FINE + 10% COARSE TZ8Y | CA-LSM-16 |
| + 20% FINE + 20% COARSE TZ8Y | CA-LSM-17 |
| + 20% FINE TZ3Y | 91-13 |
| + 20% FINE TZ3Y | 91-14 |
| + 20% FINE TZ3Y | CA-LSM-22 |
| + 10% FINE + 10% COARSE TZ8Y + 10% Ma (MaO$_2$) | CA-LSM-18 |
| + 20% FINE + 20% COARSE TZ8Y + 10% Mn (MnO$_2$) | CA-LSM-19 |
| WITHOUT YSZ + 10% Ma (SYNI) | CA-LSM-20 |
| + 20% FINE TZ8Y + 10% Ma (SYNI) | CA-LSM-21 |
| + 40% FINE TZ3Y + 10% Ma (SYNI) | CA-LSM-26 |
| + 40% FINE TZ3Y + 10% Ma (SYNI) | CA-LSM-27 |
| + 40% FINE TZ3Y + 10% Ma (SYNI) | CA-LSM-28 |

The first group includes samples made of extremely fine grained LSM, samples 91-8 and 91-7. The second group includes samples made of coarse grained $La_{1-x}Sr_xMnO_3$, samples 91-19, Ca-LSM-1,91-17, CA-LSM-2, HT1, HT2 & HT3. The third group includes samples made by mixing fine grained and coarse grained $La_{1-x}Sr_xMnO_3$, CA-LSM-20, CA-LSM-16, CA-LSM-5, CA-LSM-4, CA-LSM-21, CA-LSM-17, CA-LSM-18, CA-LSM-19, 91-13, 91-14, CA-LSM-22, CA-LSM-26, CA-LSM-27 & CA-LSM-28. Different amounts of YSZ and/or Mn were added to some of the samples, cf. Table 1.

The measuring results indicate that the polarisation resistance $R_p$ of the samples is highest for sample 91-8, which corresponds to an extremely fine grained LMS-powder. The efficiency of this sample can be improved by adding TZ7Y to the LSM slurry. $R_p$ decreases from 19.8 for 91-8 to 4.4$\Omega \cdot cm^2$ for 91-7.

Coarse grained LSM powder samples (sample 91-19, CA-LSM-1, 91-17, CA-LSM-2, HT1, HT2 & HT3) have lower $R_p$ values that the fine grained samples, cf. Table 1. The highest resistance corresponds to a sample without YSZ in the LSM slurry 91-19. The samples CA-LSM-1, 91-17 & CA-LSM-2 include the same C-layer. The same procedure has therefore been used for producing these three samples. CA-LSM-2 has, however, been subjected to an additional sintering with two effects:

a) the polarisation resistance at free potential is much lower for CA-LSM-2 and b) the sample broke.

As shown in Table 1 the best efficiency, i.e. the lowest polarisation resistance, was obtained by adding TZ3Y to the LSM slurry. A value of $R_p$ of approximately 1$\Omega \cdot cm^2$ has been obtained for the samples HT1, HT2 & HT3.

The third group includes the samples made by mixing fine and coarse grained $La_{1-x}Sr_xMnO_3$. This group can be divided into three subgroups, viz.

a) stoichiometric $La_{1-x}Sr_xMnO_3$, b) produced with 10 mol % additional Mn added in form of $MnO_2$, c) synthesized with 10 mol % additional Mn ($LSM_{1,1}$).

a) The samples of this group have been treated by adding different amounts of YSZ to the $La_{1-x}Sr_xMnO_3$ slurry. The samples CA-LSM-4 and CA-LSM-5 are identical with respect to composition and have been subjected to the same heat treatment and contain 20% TZ8Y. The differences in the $R_p$ values appear from Table 1 and indicate the deviation of the test results.

An addition of TZ8Y in form of a mixture of fine and coarse grained TZ8Y powder does not apparently improve the efficiency of the sample under the observed conditions when the content of YSZ is 20% ($R_p=1.4\Omega \cdot cm^2$ for CA-LSM-16). The polarisation resistance $R_p$ decreases, however, to a value of 0.5$\Omega \cdot cm^2$ by addition of 40% TZ8Y (sample CA-LSM-17). An addition of 20% TZ3Y reduces the polarization resistance too: values of 0.7, 0.5 and 0.3$\Omega \cdot cm^2$ were obtained for the samples 91-13, 91-14 and CA-LSM-22, cf. Table 1.

b) A comparison of the samples CA-LSM-16 & CA-LSM-18 indicates that the polarisation resistance $R_p$ decreases by addition of further Mn in form of $MnO_2$ powder, when the amount of YSZ in the sample is 20% TZ8Y. An addition of 10 mol % Mn in form of $MnO_2$ has no effect on the polarisation resistance $R_p$ for samples treated with 40% TZ8Y (compare the samples CA-LSM-17 and CA-LSM-19).

c) A drop in the polarisation resistance $R_p$ appears when manganite is synthesized with 10 mol % Mn; the polarisation resistance $R_p$ decreases from 1.1$\Omega \cdot cm^2$ for CA-LSM-5 to 0.65$\Omega \cdot cm^2$ for CA-LSM-21. The best results, i.e. the lowest polarisation resistance, were obtained with the samples CA-LSM-26, CA-LSM-27 & CA-LSM-28, where 40% TZ3Y were added to $LSM_{1,1}$.

Compared to the samples of the second group (coarse grained $La_{1-x}Sr_xMnO_3$) the polarization resistance $R_p$ of the samples in the third group decreases by addition of YSZ.

As previously mentioned, the oxygen reduction can only take place at triple contact points (TCP), where the electrode, the electrolyte, and the gas are in mutual contact. The reaction is as follows:

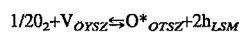

$$1/2O_2 + V_{O_{YSZ}} \leftrightarrows O^*_{O_{TSZ}} + 2h_{LSM}$$

Accordingly, the porosity of the CCC—layer can influence the admission of oxygen to the triple contact points. The reaction resistance $R_p$ depends on the number of triple contact points, i.e. the packing density of the C—layer.

The manufacturing process has the result that the packing density of the layer in direct contact with the electrolyte is very low for the samples made of very fine grained LSM (samples 91-8 and 91-7). A high polarisation resistance is expected for these samples, which is in agreement with the measuring results.

According to the literature, the adhesion between the electrode and the electrolyte has been improved, and the number of triple contact points is higher when the electrode contains YSZ. Accordingly, the reaction resistance is lower for samples with YSZ in the electrode, which also appears from the measuring results. TZ8Y possesses a higher conductivity than TZ3Y. The measuring results show, however, that the polarisation resistance $R_p$ is lower for the samples containing TZ3Y.

The positive effects of adding additional manganoxide are:

1) that formation of resistant phases of $La_2Sr_2O_7$ and $SrZrO_3$ is avoided. When no additional Mn is used for desaturating the YSZ-electrolyte with Mn (approximately 10% Mn can be dissolved in YSZ), the Mn is taken from La(Sr)MnO$_3$. As a result, La$_2$O$_4$ and SrO are formed, which both react with YSZ and produce La$_2$ZrO$_7$ and SrZrO$_3$. These high-resistant phases reduce the electrode effect considerably.

2) An improved sintering activity of the LSM-powder, whereby a large contact surface is formed between the individual LSM and YSZ grains (the sintering neck becomes thicker). The oxygen reduction takes place in the first steps on LSM, and the oxide ions must subsequently be moved on the surface across the phase limit to YSZ. As the movement across the three-phase-limit, viz. air-LSM-YSZ (=the sintering neck), apparently determines the speed, the electrode becomes better and better concurrently with an increasing number of sintering necks and with a growing circumference of each of the sintering necks.

The effect of a Y$_2$O$_3$—content lower than 8 mol % (which provides the highest electrolyte conductivity) is analogous therewith. It is well-known that the higher the Y$_2$O$_3$—content is in ZrO$_2$, the poorer the sintering thereof is. Therefore, the best electrode is a compromise between a high sintering activity (no content of Y$_2$O$_3$) and a high conductivity (8 mol % Y$_2$O$_3$), and 3 mol % Y$_2$O$_3$ turned out to be a suitable compromise.

It should be noted that beyond the difference in composition and packing density, other factors, such as porosity, thickness, and impurities can influence the polarisation resistance. The porosity of the CCC-layer can influence the admission of oxygen to the triple contact points. The thickness of the C-layer may have an effect.

The results indicate that the composition and the particle size of the studied La$_{1-x}$Sr$_x$MnO$_3$ samples are of vital importance for the speed of the oxygen-reducing process. The polarisation resistance R$_p$ is highest for the samples treated with fine grained La$_{1-x}$Sr$_x$MnO$_3$, and lower for the samples treated with coarse grained La$_{1-x}$Sr$_x$MnO$_3$.

The addition of YSZ to the oxide material improves the efficiency of La$_{1-x}$Sr$_x$MnO$_3$ as the cathode material for the solid oxide fuel cell; the polarisation resistance R$_p$ decreases concurrently with an increasing amount of YSZ apparently due to an increase of the number of triple contact points where the oxygen-reducing process can take place. Of the two types of YSZ used, the best results were obtained with TZ3Y.

The polarisation resistance R$_p$ decreases concurrently with the addition of additional 10 mol % Mn, both in form of MnO$_2$ and during synthesis when the added amount of TZ8Y is 20%.

The lowest polarisation resistance Rp has been measured for samples synthesized with 10 mol % additional Mn and 40% TZ3Y.

It is generally assumed that the sintering temperature for solid state fuel cells components for oxidation should not exceed 1400° C. in order to avoid too strong reactions between the electrode and the electrolyte material. Reported sintering temperatures for YSZ electrolyte sheets are often higher and prevent thus a coburning with the electrode components.

A procedure has been developed for the manufacture of electrolyte sheets of commercially available YSZ, which allows a sintering at 1300° C. to a density higher than 99% of the theoretical value. Another procedure has been developed for the production of Ni-cermet anodes on sintered YSZ without exceeding 1300° C.

The ceramic powder (YSZ 8 mol % Y$_2$O$_3$, TZ8Y) with a surface area of 18 m$^2$/g (B.E.T.) has been dispersed by means of 2.3% by weight of KD1 (ICI) relative to the weight of YSZ in a solution of MEK/Et (methyl-ehtylketone/ethanol, azeotropic mixture) with a high intensity of ultrasonic treatment (6 min 300W, 50% duty cycle) or preferably by ball milling by means of ZrO$_2$—balls for 24 hours. A binder containing PVB (polyvinyl butyral) with plasticizers dibutylphtalate and polyethylene glycol-400 is completely dissolved in the solution and mixed with the ceramic suspension (8% by weight of PVB relative to YSZ) by ball milling for 18 hours. The slurry is filtered through a 110 µm filter and ventilated briefly by an evacuation to 0.2 bar. The slurry is instantaneously tape-cast on polyethylene film with a movable doctor blade system. The height of the blades above the casting substrate is adjustable within 0.7 to 1.0 mm. After drying for 3 hours in a controlled environment the casting substrate is separated from the strong, semi-dry tape which can dry out completely in air.

The green tape contains 80% by weight of YSZ and presents a density of 3.3 g/cm$^3$ which indicates a content of 6 to 7% by volume. A dilatometry on cylindrical rolls of green tape indicates that a sintering below a temperature ramp of 1500° C. at a heating speed of 0.7° C./min results in a maximum shrinking of approximately 23%, 91% of the shrinking taking place below 1300° C. A sintering program for YSZ palettes has been set with a 6h ramp at 1300° C., 6h stay at 1300° C., and 5h ramp at room temperature. A sintering results in a uniform shrinking of approximately 22% and provides semi-transparent YSZ plates of a density of about 5.95 g/cm$^3$. The dimensions of the sintered, small plates are usually 45•45 mm, whereas the thickness is 160 µm. Small plates up to 90•90 mm are produced, the size only being limited by the width of the tape-casting equipment. The sintering is performed by means of a porous aluminium plate atop a zirconium plate. A waving of the zirconium plate can necessitate a flattening in connection with repeated heat treatments at 1300° C. below a weight of 10 g/cm$^3$. At AC impedance spectroscopy the conductivity at 1000° C. was measured to be 0.18 to 0.20 S/cm. SEM examinations and tests using the YSZ sheets as an electrolyte in a cell revealed that the sheets are gas-proof. The sheet strength is of importance for a reliable assembling and operation of the solid state fuel cell modules for oxidation.

In order to coburn electrolyte and electrode materials at 1300° C., a procedure has been developed for producing Ni-cermet anodes on sintered YSZ electrolyte. A large number of Ni-cermet compositions were tested by using the surface conductivity at room temperature and the adhesion between the anode and the electrolyte as a primary quality indicator. Ceramic slurries were produced and repeatedly fed to electrolyte sheets by injection moulding followed by a sintering at 1300° C./2h. The NiO—content was 56% by weight in most slurries, which corresponds to 40% by volume of Ni in the reduced cermet in order to ensure a thermal expansion coefficient adjacent the expansion coefficient of YSZ while maintaining percolation in Ni. The most important test parameter was the NiO—type (green or black) precalcination of YSZ (temperature, breaks) before the mixing with NiO and precalcination of breaks of YSZ together with NiO. Tests revealed that the surface conductivity is obtainable with 70% by weight of NiO, even with black NiO. As NiO is unable to wet YSZ, the adhesion of the reduced electrode to the electrolyte depends exclusively on the content of YSZ. A content of YSZ of 30% by weight was not sufficient for providing a good adhesion during a sintering at 1300° C.

Cermet based on 56% by weight of black NiO was not able to provide a surface conductivity.

The precalcination of NiO with a portion of YSZ at 1450° C. followed by a mixing with non-heated YSZ did not provide a surface conductivity at a sintering at 1300° C., and only a few cermet electrodes presented a good adhesion to the electrolyte. SEM of the precalcined powder showed that NiO was present on the entire YSZ surface, which apparently suppresses a sintering to the electrolyte.

The slurry involving a mixing of green NiO with precalcined YSZ (at 1000° to 1450° C.) indicated that a predetermined amount of non-calcined YSZ was necessary in order to obtain both a surface conductivity and an adhesion. When at least 20% of the total YSZ was non-calcined, a surface conductivity was obtained in most cases. The precalcination temperature is apparently of minor importance for the conductivity, whereas the adhesion to the electrolyte was promoted by low precalcination temperatures of 1000° to 1100° C.

The milling/mixing techniques turned out to be important. The precalcination of the slurries was performed by ultrasonic treatment of a high intensity or by ball milling by means of zirconium balls in polyethylene containers or in zirconium mills. The ultrasonic treatment turned out to be insufficient, especially in connection with large slurry volumes. A relationship between cermet adhesion to the electrolyte and the hardness of the ball milling was observed. While milling in polyethylene containers for 24 hours in general resulted in a good adhesion between the cermet and the electrolyte, an extension of the milling period reduced the adhesion to a level comparable with 20 min milling in a zirconium ball mill. An extension of the milling period in the zirconium ball mill to 1 hour resulted in a poor adhesion.

The results of the tests were used for setting up the following procedure for producing an Ni-cermet:

i) Green NiO is dispersed with 5% by weight of PVP (polyvinyl pyrrolidone, M=1000) in ethanol by ball milling for 24 hours in a polyethylene container containing zirconium balls, ii) TZ8Y calcined at 1100° C./2h and non-calcined TZ8Y in the ratio 1:1 with 5% by weight of PVP are added to the slurry i) in order to provide a weight ratio of NiO to YSZ of 56:44. The ball milling is carried out for 24 hours.

iii) The slurry is deposited by air injection milling on degreased YSZ plates in a 5 to 10 µm thick layer and sintered after drying at 1300° C./2h. The following layer is deposited atop the thin layer by spraying and sintering at 1300° C./2h. Subsequently, up to 250 µm thick layers were successfully applied in one operation, a layer thickness of 40 µm usually being used.

The total density of the sintered NiO-cermet was set to 50% of the theoretical value. After reduction in $H_2$, a surface conductivity of up to 1000 S/cm was obtained at room temperature with the low Ni-content.

Figure 4:
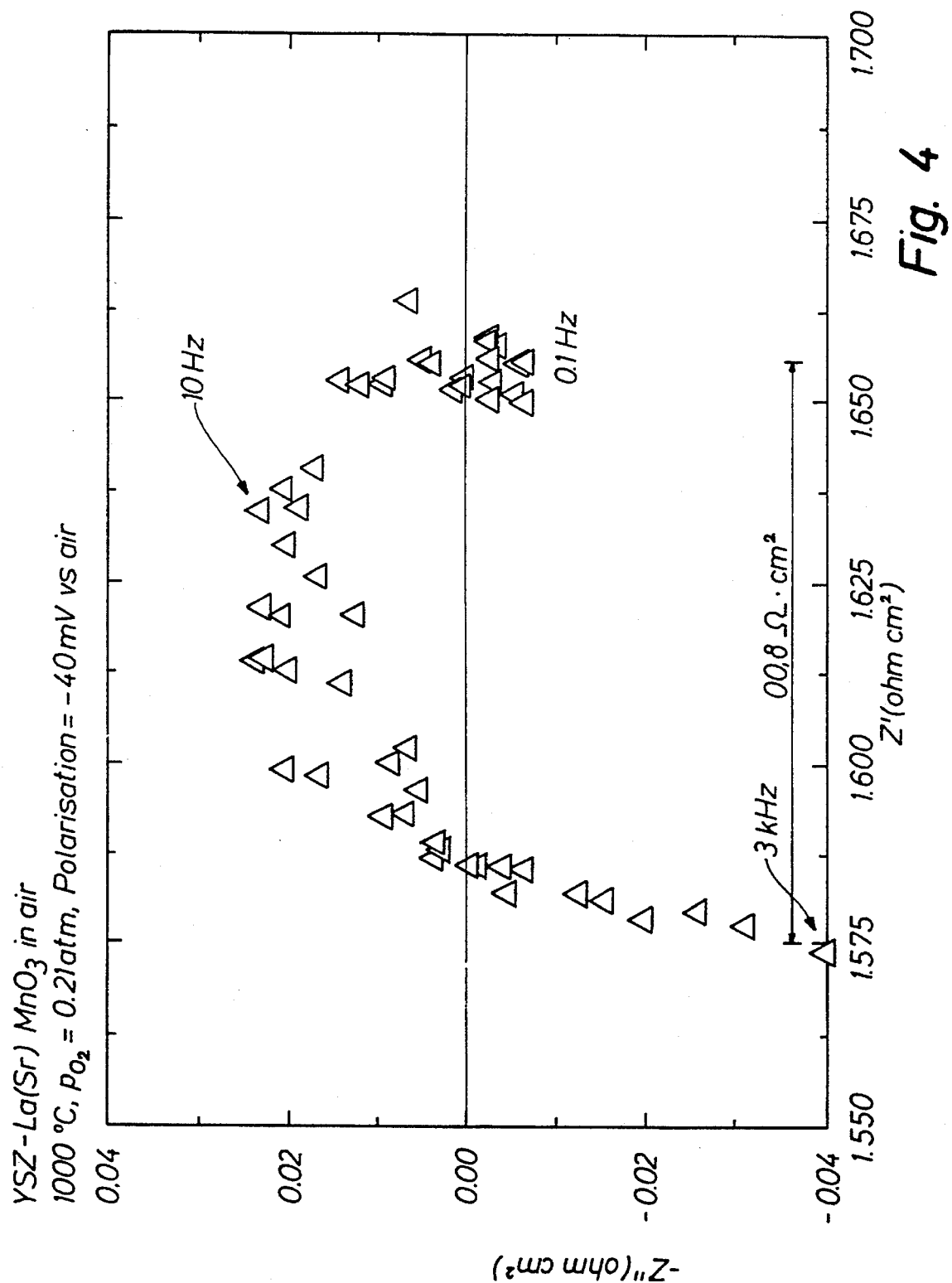

The reduced Ni-cermet turned out to possess good electrolytic properties. The polarisation resistance in $H_2$ with 3% water was set to $0.18\Omega \cdot cm^2$ at OCV and $0.06\Omega \cdot cm^2$ at a polarisation of 45 mV, which provides a current density of 750 mA/$cm^2$, cf. FIG. 4.

Techniques have been developed for producing 45·45·0.016 mm electrolyte plates ($ZrO_2$, 8 mol % $Y_2O_3$ (YSZ) by tape-casting and for producing La(Sr)$MnO_3$ and La(Ca)$CrO_3$ for cathodes and interrelations. Ni-cermet anodes with a low Ni-content (40% by volume in reduced form) and LSM-based cathodes are mounted on sintered electrolyte plates by injection milling.

A development of a material composition for electrolytes and a development of production parameters require an analysis of the efficiency of a cell. The analysis is carried out in an environment excluding stack-related problems, such as variations in local gas composition and chemical interaction in connecting/sealing materials. Test facilities have been provided for the analysis of the efficiency of a cell under such conditions.

Figure 5:
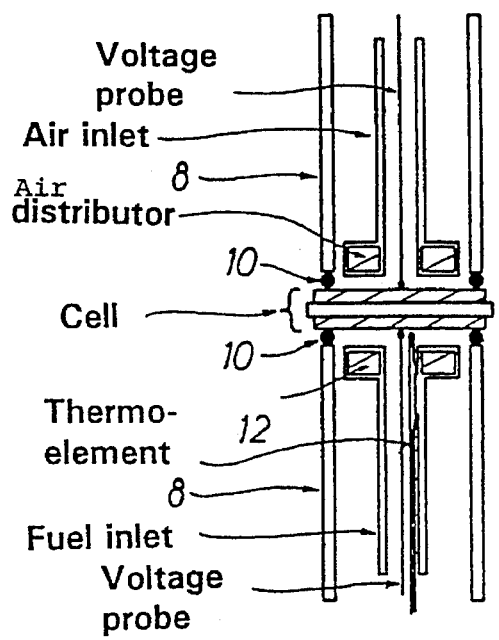

A test facility appears from FIG. 5. A single solid state cell for oxidation is horizontally arranged between to 40 mm OD aluminium pipes 8 in a split oven. A sealing between the cell and the pipes 8 is provided on both sides by means of a gold ring 10 simultaneously acting as current collector. The gold ring 10 is composed of ½ mm gold wire. Larger dimensions can, however, also apply. The gold ring 10 is compressed at operation temperature by being subjected to an axial force of 100 to 500 g. The diameter of the gold ring 10 defines a test area of 10 $cm^2$. Fuel gases and air are carried through central aluminium pipes provided with annular distribution plates 12. These plates 12 are formed with radial grooves placed approximately 1 mm from the electrode face during the testing. Platinum wires contact the cell at the centre of potential measurement ($V_C$). The potential $V_R$ at the rim of the cell is measured by at the current outlet from the gold ring 10. The temperature of the cell is usually 1000° C., and it is measured outside the test structure at the rim of the electrolyte and inside the structure at a distance of 1 mm from the center of the anode. The structure materials have been chosen such that a cracking of hydrocarbons caused by planned reforming tests is avoided. 9% $H_2$ in $N_2$ are commonly used as a fuel gas in order to exclude the risk of explosions. The gas is saturated with water at room temperature in order to provide a difference in oxygen partial pressure corresponding to an open circuit voltage of 930 mV.

Figure 6:
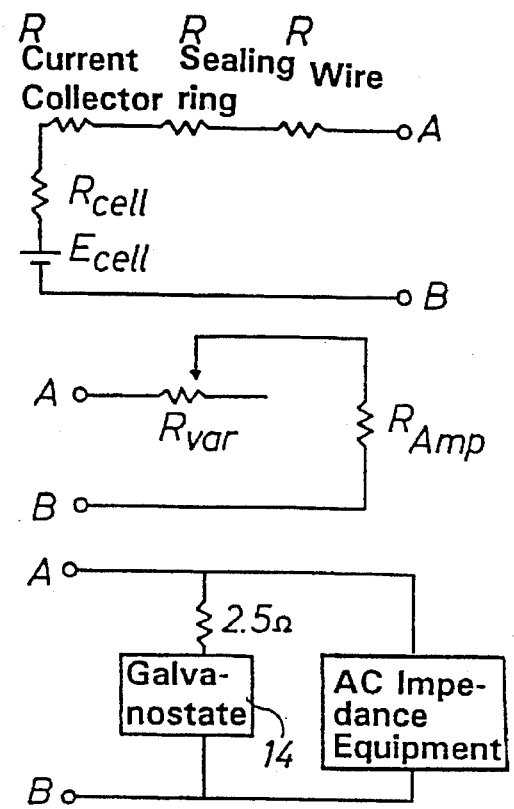

The resistance of the external circuit for measuring the current has been minimized. Each gold ring is connected to an amperemeter. The resulting total resistance of the circuit connecting the current collection system is 67 mΩ. The additional resistance of the current collection system is discussed below. FIG. 6 shows the electric assembly including a galvanostate 14. The assembly renders it possible to place AC signals on DC loads. The high resistance in series with the low-impedance galvanostate 14 ensures that the resulting cell impedance can be accurately calculated, even at high variations in the galvanostate impedance (0 to 100 H).

Figure 7:
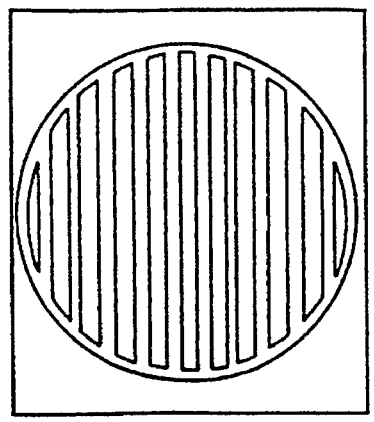

During the testing of a cell, the main interest is related to the resistance components of the cell in a direction perpendicular to the cell caused by the development of bipolar structures. In order to minimize the effect of the surface resistance of the electrodes, a current collector pattern of platinum and/or gold has been applied onto the electrode surfaces by way of serigraphy. FIG. 7 shows the current collector pattern applied onto both electrodes. The pattern includes a circle forming the contact basis to the gas sealing and the current-collecting gold ring (the gas sealing). A plurality of strips of a width of 1 mm form the current collection system, where the strips, the contact areas to the connecting plates, and the areas between the strips correspond to gas channels in the mutual connection and are therefore without direct contact to the mutual connection. A painted porous platinum layer covers the central 8% of the cell face. After a compression step followed by a sintering, the platinum layer usually has a thickness of 10 µm. Several compressions may apply. A platinum print must always be provided on the anode side in order to prevent a reaction between gold and nickel at an elevated temperature. A gold print can be applied atop the platinum print on the anode and directly on the cathode side.

The presence of a surface resistance in either electrodes or in the metallic current collection system causes a varying radial distribution of current density, i.e. the center of the circular test area presents a lower current density than the rim area. The difference in current density is reflected in the measured potential values $V_C$ and $V_R$, where $V_C > V_R$.

The measured potential value $V_R$ includes the voltage drop across the resistance of the current-collecting gold sealings 10. The Ohmic resistance at 1000° C. of a gold wire used for the entire ring 10 has been measured to 71 mΩ. When the ring 10 is considered to be two parallel conductors, each conductor being of half the length of the periphery, and when the sum of the currents is fed half-way between the terminals, the resulting resistance of each ring must be 9 mΩ. 3 mΩ must be added in order to count for the resistance of the terminal end (two wires of a length of 10 mm), which results in 12 mΩ per ring. Values of $V_R$ corrected for the resulting voltage drop are assumed to represent the rim potential $V_R$ of the cell.

Figure 8:
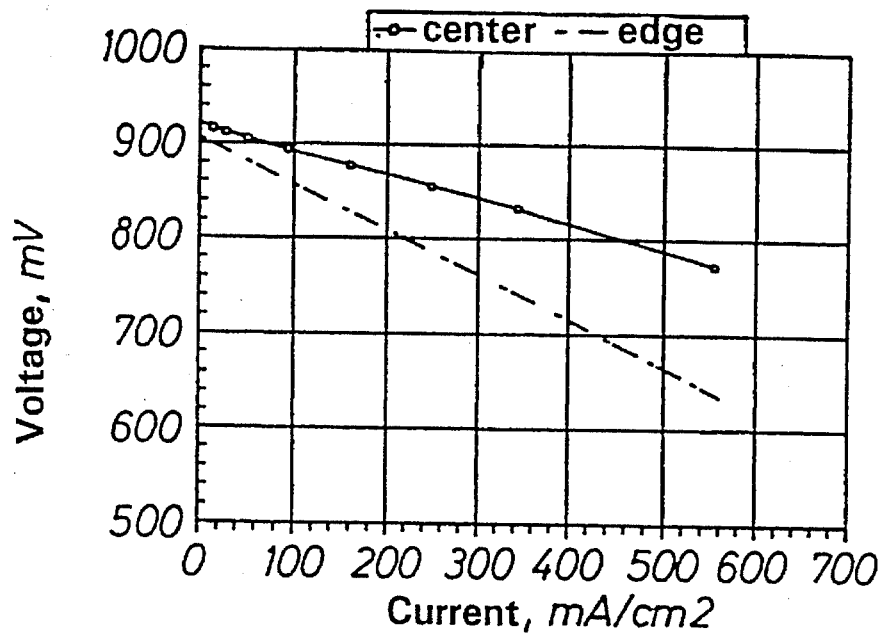

A calculation of the area-specific, apparent cell resistance for measured current loads can be performed on the basis of the cell area, OCV (voltage with an open circuit) and VC (resulting in $R_C$) as well as the corrected $V_R$ (resulting in $R_R$). FIG. 8 shows E-I curves measured on a good cell. A calculation of the average inclination of the two curves results in $R_C=0.25 \Omega \cdot cm^2$, and $R_V=0.46 \Omega \cdot cm^2$ where the OCV values were 913 mV at the center and 900 mV at the rim, the OCV values indicating a minor air leak to the system probably below the gold ring 10 through the porous anode. Based on these apparent resistances it is possible by means of a computer model to find the true cell resistance.

Figure 9:

The circular test area is divided into five concentric rings by means of the above model, each concentric ring being of a width of ⅕ radius, cf. FIG. 9. The rings are numbered 1 to 5, the numbering starting from the rim. Each ring is assigned to a cross-plane cell resistance $W_i$ that is proportional to the area of the ring and proportional to the true internal area-specific cell resistance $R_x \Omega \cdot cm^2$ to be determined. Each ring has been assigned to a surface resistance $RP_i$ assumed to be inversely proportional to the length of the outer diameter of the ring and a factor $K_R$. For ring No. 1, the length of the current path to the current-collecting gold ring corresponds to only half the length of the outer rings, The surface resistance $RP_I$ has therefore been reduced correspondingly. FIG. 9 shows the electric equivalent circuit.

Found inlet values are: cell area, measured values of the total current I, the potential of the center ring $V_C=E_5$, and the potential at the rim $V_R$ (corrected for voltage drop across the gold sealings). Assuming that the linearity of E=F (I) across the range ECV–$V_r$, iterations are performed with $R_x$ beginning with $R_r$ and decreasing towards $R_c$. During each iteration cycle, the current $I_5$ through $W_5$ is found on the basis of $E_5$. The potential drop between the cell elements 5 and 4 caused by the surface conductivity $\Delta E_5 = RP_5 \cdot I_5$ sets $E_4 = E_5 - \Delta E_5$, which is correspondingly for element No. 4 using $W_4$ to achieve $I_4$. The surface conductivity of $I_5 + I_4$ through $RP_4$ results in a potential drop $\Delta E_4 = (I_5 + I_4) \cdot RP_4$ used for determining $E_3 = E_4 - \Delta E_4$. Finally, the voltage drop at conducting the sum of ring currents $\Sigma I_n$ across the outer half of the ring I on $\Delta E_I = \Sigma I_n \cdot RP_1$ results in the rim voltage $E_1 - \Delta E_1$ comparable with $V_r$. During each iteration cycle, a value of $K_r$ is searched for by a secondary iteration in order to satisfy the criteria $\Sigma \Delta E_n = V_c - V_r$.

Figure 10:
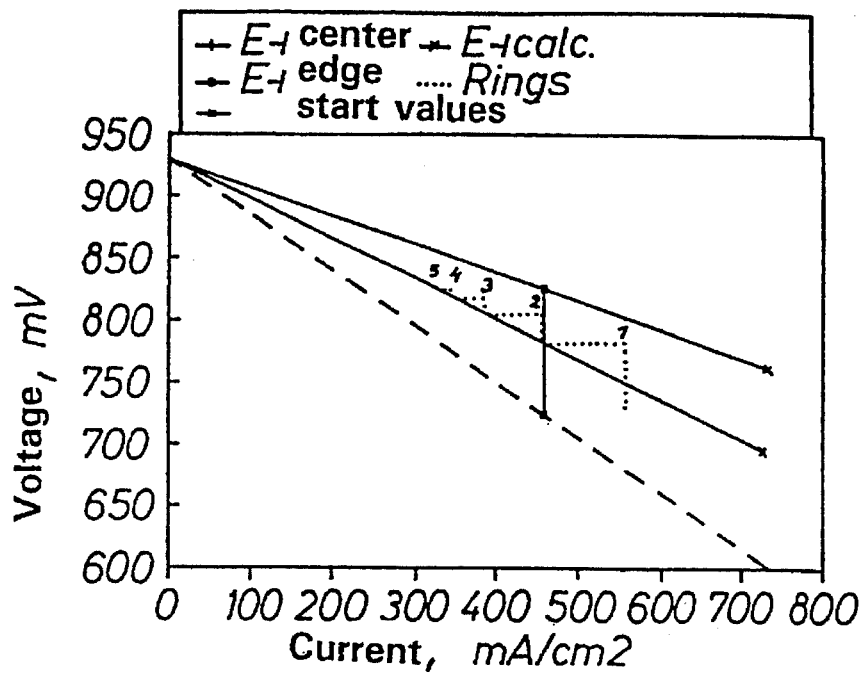
Figure 11:
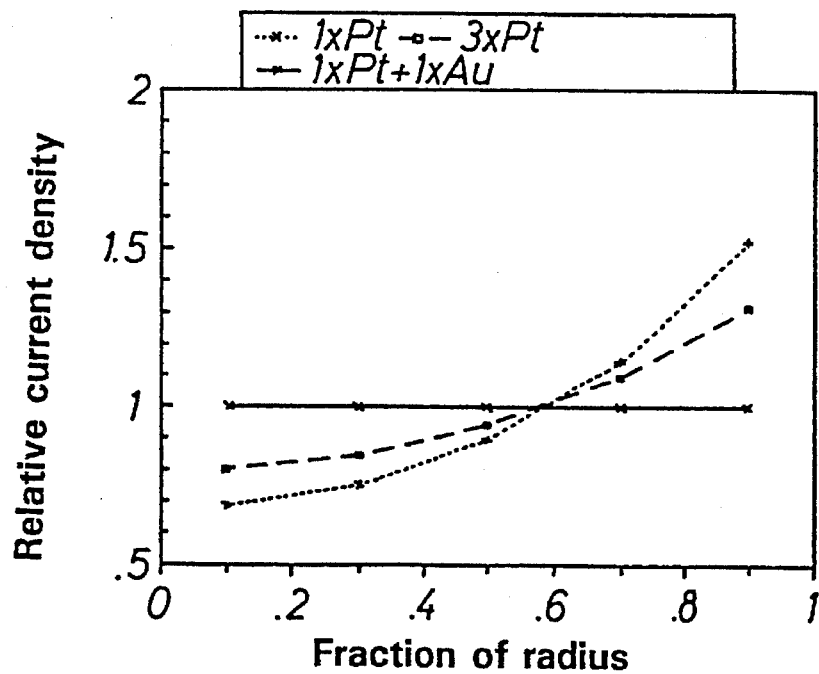

FIG. 10 illustrates the above evaluation of $I_n$ for a cell. The resulting, normalized current densities versus the radius appear from FIG. 11 for a cell with two platinum current-collecting prints on each side. A calculated distribution of the current densities on a cell with one platinum print and a gold print on each side has furthermore been shown. The conductivity of gold at 1000° C. is almost 4 times higher than for platinum, and the calculated radial current density variation is therefore almost insignificant.

Although other modifications and changes may be suggested by those skilled in the art, it is the intention of the inventors to embody within the patent warranted hereon all changes and modifications as reasonably and properly come within the scope of their contribution to the art.

I claim:

1. A solid oxide fuel cell, comprising:

a cathode, a yttrium stabilized zirconium oxide—electrolyte, and an anode, where the cathode is a mixture of $La_{1-x}Sr_xMnO_3$ and yttrium stabilized zirconium oxide, the yttrium stabilized zirconium oxide of the cathode amounting to 20 to 75% by weight, and the yttrium stabilized zirconium oxide content of the cathode containing less $Y_2O_3$ than the yttrium stabilized zirconium oxide content of the electrolyte, wherein $0<x<1$.

2. A solid oxide fuel cell as claimed in claim 1, wherein the cathode further comprises excess Mn.

3. A solid oxide fuel cell as claimed in claim 1, further comprising: a layer of $La_{1-x}Sr_xMnO_3$ sintered on an outside of the cathode.

4. A solid oxide fuel cell as claimed in claim 1, wherein said cathode contains less than 8 mol % of $Y_2O_3$.

5. A solid oxide fuel cell as claimed in claim 4, wherein said cathode contains approximately 3 mol % of $Y_2O_3$.

* * * * *